US012603730B2

(12) United States Patent
He et al.

(10) Patent No.: US 12,603,730 B2
(45) Date of Patent: Apr. 14, 2026

(54) HYBRID AUTOMATIC REPEAT REQUEST PROCESS DETERMINATION FOR ENHANCED SEMI-PERSISTENT SCHEDULING AND/OR CONFIGURED GRANT CONFIGURATION

(71) Applicant: QUALCOMM Incorporated, San Diego, CA (US)

(72) Inventors: Linhai He, San Diego, CA (US); Huilin Xu, Temecula, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 18/314,329

(22) Filed: May 9, 2023

(65) Prior Publication Data

US 2023/0379101 A1 Nov. 23, 2023

Related U.S. Application Data

(60) Provisional application No. 63/365,185, filed on May 23, 2022.

(51) Int. Cl.
*H04L 1/1867* (2023.01)
*H04L 1/1812* (2023.01)
*H04W 72/11* (2023.01)

(52) U.S. Cl.
CPC .......... *H04L 1/1887* (2013.01); *H04L 1/1812* (2013.01); *H04W 72/11* (2023.01)

(58) Field of Classification Search
CPC ... H04L 1/1887; H04L 1/1812; H04L 1/1822; H04L 1/1835; H04L 1/1854; H04L 1/1864; H04W 72/11; H04W 72/042; H04W 72/23
See application file for complete search history.

(56) References Cited

U.S. PATENT DOCUMENTS

| | | | | |
|---|---|---|---|---|
| 2020/0351026 A1* | 11/2020 | Babaei | ................. | H04L 1/1835 |
| 2021/0099254 A1* | 4/2021 | Babaei | ................. | H04W 72/23 |
| 2021/0234640 A1* | 7/2021 | Cirik | ..................... | H04L 1/1854 |
| 2022/0046677 A1* | 2/2022 | Talarico | ................ | H04W 72/23 |

(Continued)

FOREIGN PATENT DOCUMENTS

KR 20220051798 A 4/2022

OTHER PUBLICATIONS

International Search Report and Written Opinion—PCT/US2023/021708—ISA/EPO—Aug. 24, 2023.

*Primary Examiner* — Rushil P. Sampat
(74) *Attorney, Agent, or Firm* — Harrity & Harrity, LLP

(57) ABSTRACT

Various aspects of the present disclosure generally relate to wireless communication. In some aspects, a network entity may transmit, and a user equipment (UE) may receive, a scheduling configuration that configures multiple transport blocks to be transmitted in a pre-scheduled burst of transmission occasions. The network entity and the UE may communicate, for each transmission occasion in the pre-scheduled burst of transmission occasions, a transport block that is transmitted in a respective transmission occasion and associated with a hybrid automatic repeat request (HARQ) process identifier that is based at least in part on a HARQ configuration associated with the scheduling configuration. Numerous other aspects are described.

16 Claims, 10 Drawing Sheets

(56) References Cited

U.S. PATENT DOCUMENTS

| 2022/0095359 | A1 |   | 3/2022  | Wei et al.   |         |           |
|--------------|-----|---|---------|--------------|---------|-----------|
| 2022/0104187 | A1 |   | 3/2022  | Zhou et al.  |         |           |
| 2022/0322314 | A1 | * | 10/2022 | Rastegardoost | ...... | H04W 72/23 |

* cited by examiner

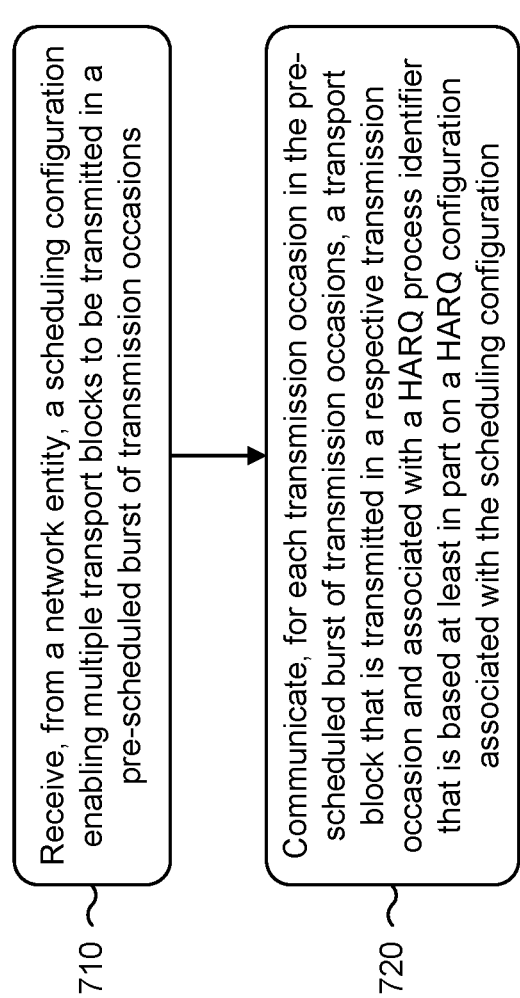

700

710 Receive, from a network entity, a scheduling configuration enabling multiple transport blocks to be transmitted in a pre-scheduled burst of transmission occasions 720 Communicate, for each transmission occasion in the pre-scheduled burst of transmission occasions, a transport block that is transmitted in a respective transmission occasion and associated with a HARQ process identifier that is based at least in part on a HARQ configuration associated with the scheduling configuration

FIG. 7

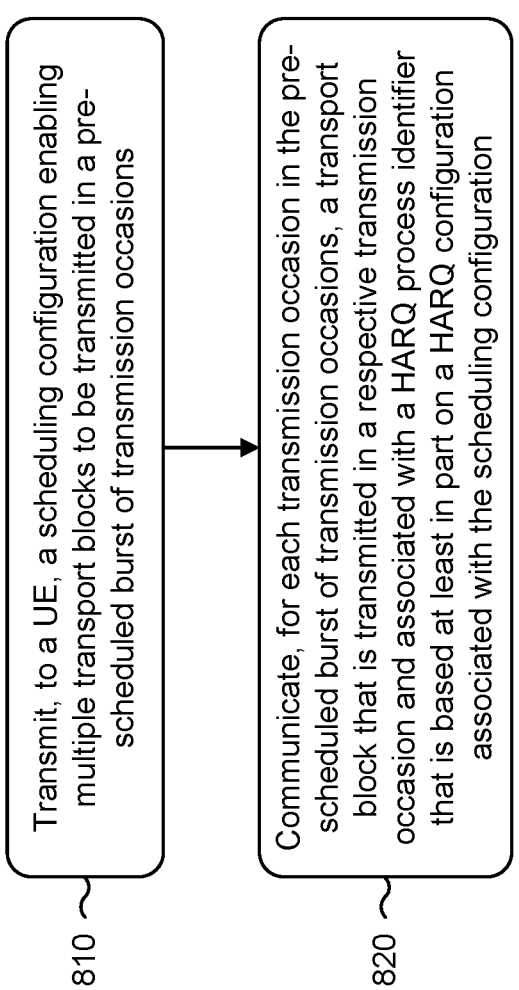

Transmit, to a UE, a scheduling configuration enabling multiple transport blocks to be transmitted in a pre-scheduled burst of transmission occasions

810

Communicate, for each transmission occasion in the pre-scheduled burst of transmission occasions, a transport block that is transmitted in a respective transmission occasion and associated with a HARQ process identifier that is based at least in part on a HARQ configuration associated with the scheduling configuration

HYBRID AUTOMATIC REPEAT REQUEST PROCESS DETERMINATION FOR ENHANCED SEMI-PERSISTENT SCHEDULING AND/OR CONFIGURED GRANT CONFIGURATION

CROSS-REFERENCE TO RELATED APPLICATION

This Patent Application claims priority to U.S. Provisional Patent Application No. 63/365,185, filed on May 23, 2022, entitled "HYBRID AUTOMATIC REPEAT REQUEST PROCESS DETERMINATION FOR ENHANCED SEMI-PERSISTENT SCHEDULING AND/OR CONFIGURED GRANT CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses associated with a hybrid automatic repeat request (HARM) process determination for an enhanced semi-persistent scheduling (SPS) and/or configured grant (CG) configuration.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a network entity, a scheduling configuration that configures multiple transport blocks to be transmitted in a pre-scheduled burst of transmission occasions. The one or more processors may be configured to communicate, for each transmission occasion in the pre-scheduled burst of transmission occasions, a transport block that is transmitted in a respective transmission occasion and associated with a hybrid automatic repeat request (HARQ) process identifier that is based at least in part on a HARQ configuration associated with the scheduling configuration.

Some aspects described herein relate to a network entity for wireless communication. The network entity may include a memory and one or more processors coupled to the memory. The one or more processors may be configured to transmit, to a UE, a scheduling configuration that configures multiple transport blocks to be transmitted in a pre-scheduled burst of transmission occasions. The one or more processors may be configured to communicate, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Some aspects described herein relate to a method of wireless communication performed by a UE. The method may include receiving, from a network entity, a scheduling configuration that configures multiple transport blocks to be transmitted in a pre-scheduled burst of transmission occasions. The method may include communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Some aspects described herein relate to a method of wireless communication performed by a network entity. The method may include transmitting, to a UE, a scheduling configuration that configures multiple transport blocks to be transmitted in a pre-scheduled burst of transmission occasions. The method may include communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Some aspects described herein relate to a non-transitory computer-readable medium that stores a set of instructions for wireless communication by a UE. The set of instructions, when executed by one or more processors of the UE, may cause the UE to receive, from a network entity, a scheduling configuration that configures multiple transport blocks to be transmitted in a pre-scheduled burst of transmission occasions. The set of instructions, when executed by one or more processors of the UE, may cause the UE to communicate, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Some aspects described herein relate to a non-transitory computer-readable medium that stores a set of instructions for wireless communication by a network entity. The set of instructions, when executed by one or more processors of the network entity, may cause the network entity to transmit, to a UE, a scheduling configuration that configures multiple transport blocks to be transmitted in a pre-scheduled burst of transmission occasions. The set of instructions, when executed by one or more processors of the network entity, may cause the network entity to communicate, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Some aspects described herein relate to an apparatus for wireless communication. The apparatus may include means for receiving, from a network entity, a scheduling configuration that configures multiple transport blocks to be transmitted in a pre-scheduled burst of transmission occasions. The apparatus may include means for communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Some aspects described herein relate to an apparatus for wireless communication. The apparatus may include means for transmitting, to a UE, a scheduling configuration that configures multiple transport blocks to be transmitted in a pre-scheduled burst of transmission occasions. The apparatus may include means for communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Aspects generally include a method, apparatus, system, computer program product, non-transitory computer-readable medium, user equipment, base station, network node, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-8 are diagrams illustrating example processes associated with a HARQ process determination for an enhanced SPS and/or CG configuration, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
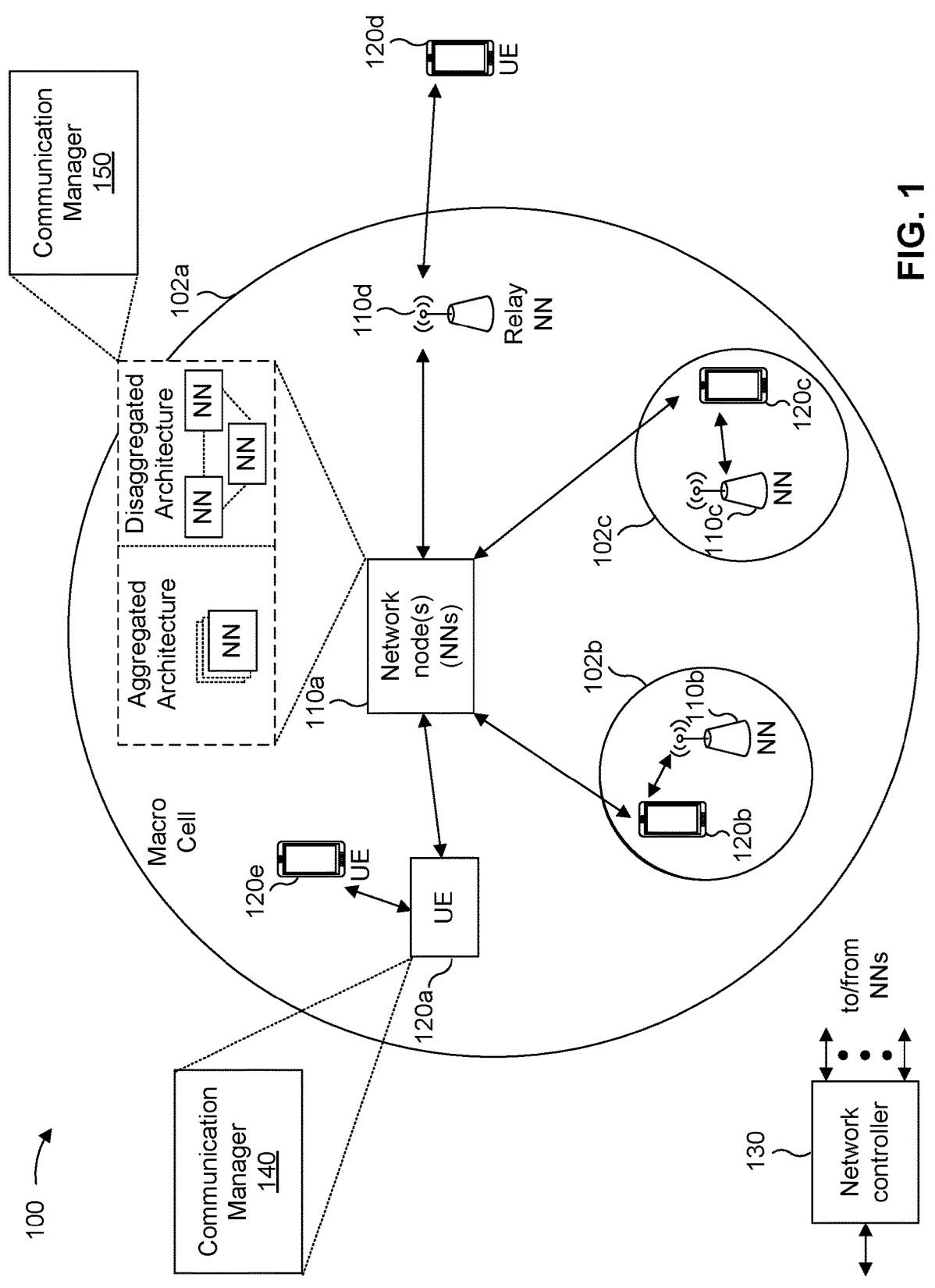
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a radio protocol stack that is physically or logically distributed among two or more nodes (such as one or more central units (CUs), one or more distributed units (DUs), or one or more radio units (RUs)).

In some examples, a network node 110 is or includes a network entity that communicates with UEs 120 via a radio access link, such as an RU. In some examples, a network node 110 is or includes a network entity that communicates with other network nodes 110 via a fronthaul link or a midhaul link, such as a DU. In some examples, a network node 110 is or includes a network entity that communicates with other network nodes 110 via a midhaul link or a core network via a backhaul link, such as a CU. In some aspects, a network node 110 (such as an aggregated network node 110 or a disaggregated network node 110) may include multiple network nodes, such as one or more RUs, one or more DUs, and/or one or more CUs. A network node 110 may include, for example, an NR base station, an LTE base station, a Node B, an eNB (e.g., in 4G), a gNB (e.g., in 5G), an access point, a transmission reception point (TRP), an RU, a DU, a CU, a mobility element of a network, a core network node, a network element, a network equipment, a RAN node, or a combination thereof. In some examples, the network nodes 110 may be interconnected to one another and/or to one or more other network nodes 110 in the wireless network 100 through various types of fronthaul, midhaul, and/or backhaul interfaces, such as a direct physical connection, an air interface, or a virtual network, using any suitable transport network.

In some aspects, a network node 110 may provide communication coverage for a particular geographic area. In the Third Generation Partnership Project (3GPP), the term "cell" can refer to a coverage area of a base station and/or a base station subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the network node 110a may be a macro base station for a macro cell 102a, the network node 110b may be a pico base station for a pico cell 102b, and the network node 110c may be a femto base station for a femto cell 102c. A base station may support one or multiple (e.g., three) cells.

In some examples, a cell may not necessarily be stationary, and the geographic area of the cell may move according to the location of a network node 110 that is mobile (e.g., a mobile base station).

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120 or network nodes 110. In the example shown in FIG. 1, the network node 110d (e.g., a relay base station) may communicate with the network node 110a (e.g., a macro base station) and the UE 120d in order to facilitate communication between the network node 110a and the UE 120d. A network node 110 that relays communications may be referred to as a relay station, a relay base station, a relay node, a relay, or the like.

The wireless network 100 may be a heterogeneous network that includes network nodes 110 of different types, such as macro base stations, pico base stations, femto base stations, relay base stations, TRPs, RUs, or the like. These different types of network nodes 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul or midhaul communication link. The network nodes 110 may communicate with one another directly or indirectly via a wireless or wireline backhaul communication link. In some aspects, the network controller 130 may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity (e.g., a network node 110), a scheduling configuration that configures multiple transport blocks to be transmitted in a pre-scheduled burst of transmission occasions; and process, communicate, for each transmission occasion in the pre-scheduled burst of transmission occasions, a transport block that is transmitted in a respective transmission occasion and associated with a hybrid automatic repeat request (HARQ) process identifier that is based at least in part on a HARQ configuration associated with the scheduling configuration. Additionally, or alternatively, the communication manager 140 may perform one or more other operations described herein.

In some aspects, a network entity (e.g., the network node 110) may include a communication manager 150. As described in more detail elsewhere herein, the communication manager 150 may transmit, to a UE 120, a scheduling configuration that configures multiple transport blocks to be transmitted in a pre-scheduled burst of transmission occasions; and communicate, for each transmission occasion in the pre-scheduled burst of transmission occasions, a transport block that is transmitted in a respective transmission occasion and associated with a HARQ process identifier that is based at least in part on a HARQ configuration associated with the scheduling configuration. Additionally, or alternatively, the communication manager 150 may perform one or more other operations described herein.

As indicated above, FIG. 1 is provided as an example. Other examples may differ from what is described with regard to FIG. 1.

Figure 2:
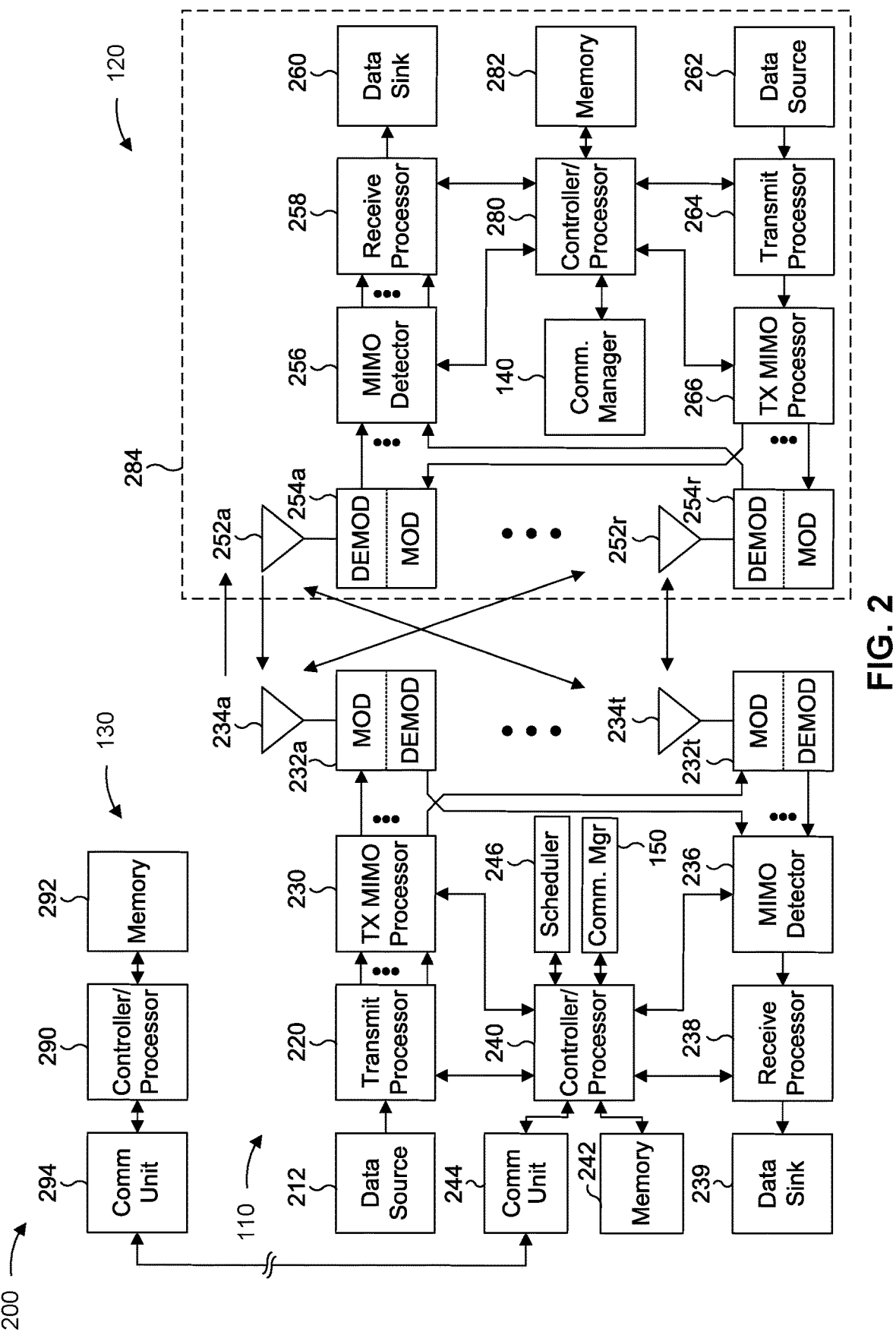
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. For example, some network nodes 110 may not include radio frequency components.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with a HARQ process determination for an enhanced semi-persistent scheduling (SPS) and/or configured grant (CG) configuration, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/ or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network entity (e.g., the network node 110), a scheduling configuration that configures multiple transport blocks to be transmitted in a pre-scheduled burst of transmission occasions; and/or means for communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the network node 110) includes means for transmitting, to a UE 120, a scheduling configuration that configures multiple transport blocks to be transmitted in a pre-scheduled burst of transmission occasions; and/or means for communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
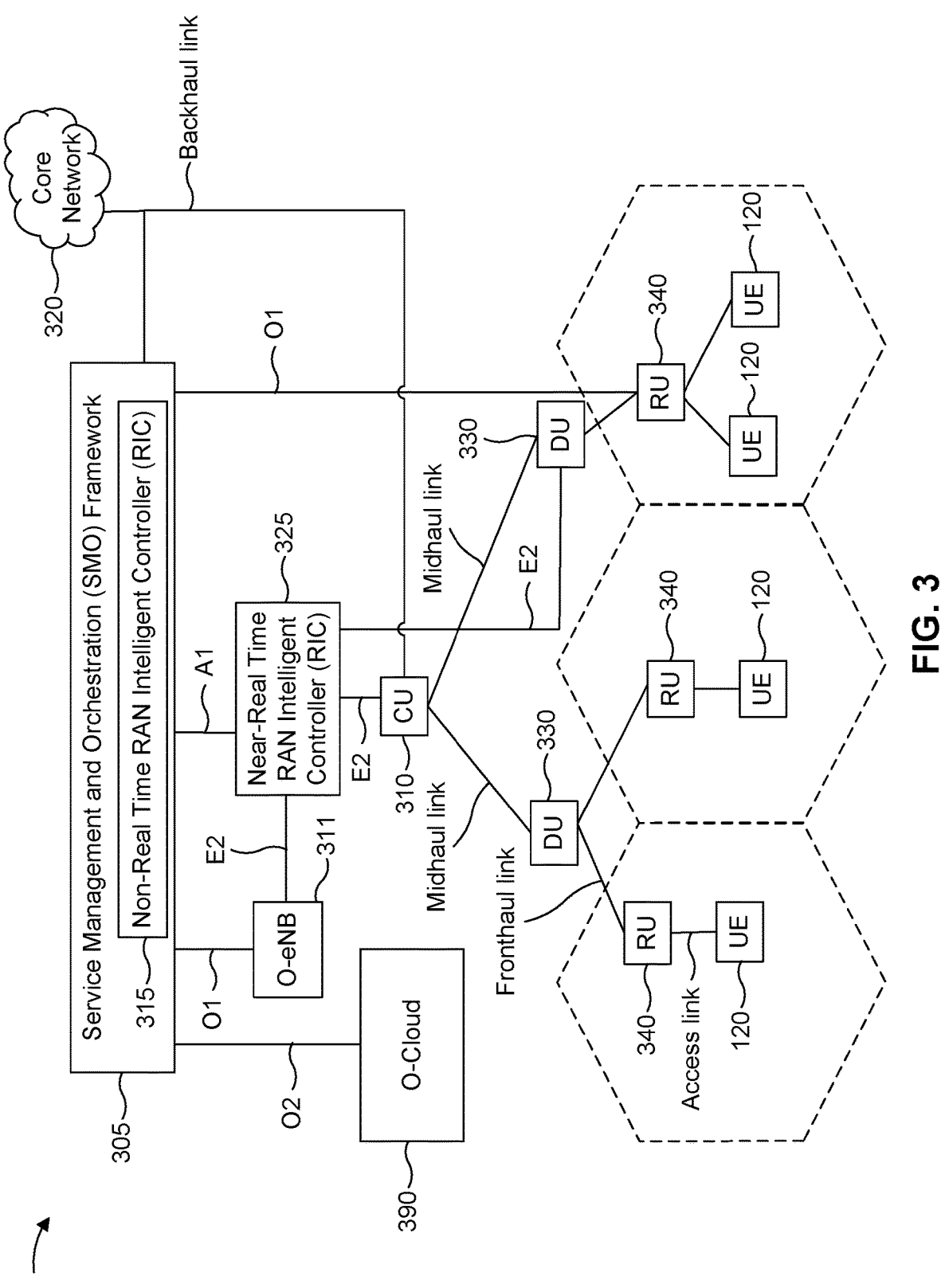
FIG. 3 is a diagram illustrating an example of a disaggregated base station, in accordance with the present disclosure.

FIG. 3 is a diagram illustrating an example of a disaggregated base station, in accordance with the present disclosure.

Deployment of communication systems, such as 5G NR systems, may be arranged in multiple manners with various components or constituent parts. In a 5G NR system, or network, a network node may be implemented in an aggregated architecture or a disaggregated architecture. For example, a network node, or one or more units (or one or more components) performing network node functionality, may be implemented as an aggregated network node (sometimes referred to as a standalone base station or a monolithic base station) or a disaggregated network node. "Network entity" or "network node" may refer to a disaggregated network node, an aggregated network node, or one or more entities of a disaggregated network node (such as one or more CUs, one or more DUs, one or more RUs, or a combination thereof).

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC 325) via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more radio frequency (RF) access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
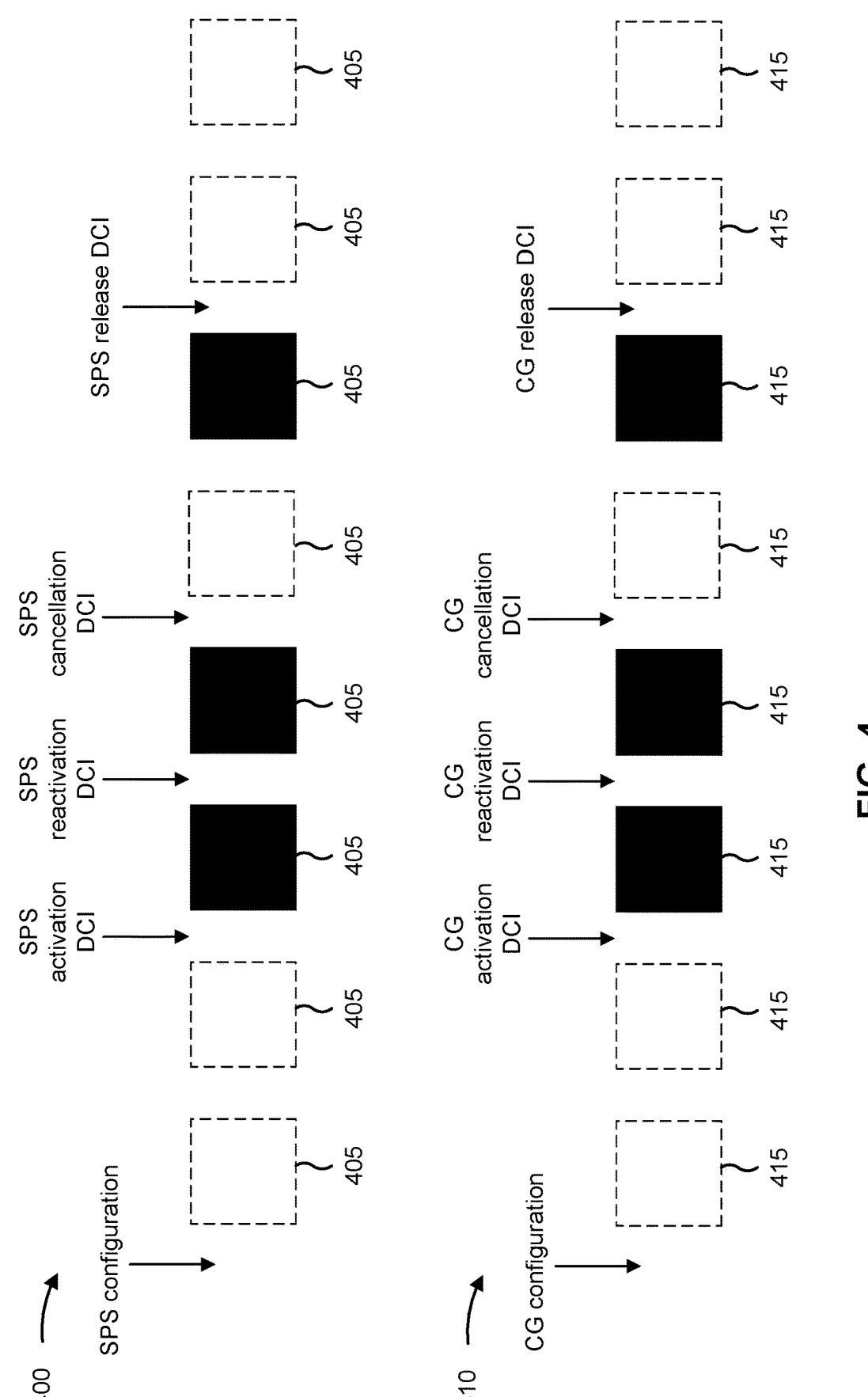
FIG. 4 is a diagram illustrating an example of downlink semi-persistent scheduling (SPS) communication and an example of uplink configured grant (CG) communication, in accordance with the present disclosure.

FIG. 4 is a diagram illustrating an example 400 of downlink SPS communication and an example 410 of uplink CG communication, in accordance with the present disclosure. SPS communications may include periodic downlink communications that are configured for a UE, such that a network node does not need to send separate downlink control information (DCI) to schedule each downlink communication, thereby reducing latency and signaling overhead. CG communications may include periodic uplink communications that are configured for a UE, such that the network node does not need to send separate DCI to schedule each uplink communication, thereby reducing latency and signaling overhead.

As shown in example 400, a UE may be configured with an SPS configuration for grant-free downlink communications. For example, the UE may receive the SPS configuration via an RRC message transmitted by a network node. The SPS configuration may indicate a resource allocation associated with SPS downlink communications (e.g., in a time domain, frequency domain, spatial domain, and/or code domain) and a periodicity at which the resource allocation is repeated, resulting in periodically recurring scheduled SPS occasions 405 for the UE. The SPS configuration may also configure HARQ-acknowledgement (HARQ-ACK) feedback resources for the UE to transmit HARQ-ACK feedback for SPS physical downlink shared channel (PDSCH) communications received in the SPS occasions 405. For example, the SPS configuration may indicate a PDSCH-to-HARQ feedback timing value, which may be referred to as a K1 value in a wireless communication standard (e.g., a 3GPP standard).

The network node may transmit SPS activation DCI to the UE to activate the SPS configuration for the UE. The network node may indicate, in the SPS activation DCI, communication parameters, such as an MCS, a resource block (RB) allocation, and/or antenna ports, for the SPS PDSCH communications to be transmitted in the scheduled SPS occasions 405. The UE may begin monitoring the SPS occasions 405 based at least in part on receiving the SPS activation DCI. For example, beginning with a next scheduled SPS occasion 405 subsequent to receiving the SPS activation DCI, the UE may monitor the scheduled SPS occasions 405 to decode PDSCH communications using the communication parameters indicated in the SPS activation DCI. The UE may refrain from monitoring configured SPS occasions 405 prior to receiving the SPS activation DCI.

The network node may transmit SPS reactivation DCI to the UE to change the communication parameters for the SPS PDSCH communications. Based at least in part on receiving the SPS reactivation DCI, the UE may begin monitoring the scheduled SPS occasions 405 using the communication parameters indicated in the SPS reactivation DCI. For example, beginning with a next scheduled SPS occasion 405 subsequent to receiving the SPS reactivation DCI, the UE may monitor the scheduled SPS occasions 405 to decode PDSCH communications based on the communication parameters indicated in the SPS reactivation DCI.

In some cases, such as when the network node does not have downlink traffic to transmit to the UE, the network node may transmit SPS cancellation DCI to the UE to temporarily cancel or deactivate one or more subsequent SPS occasions 405 for the UE. The SPS cancellation DCI may deactivate only a subsequent one SPS occasion 405 or a subsequent N SPS occasions 405 (where N is an integer). SPS occasions 405 after the one or more (e.g., N) SPS occasions 405 subsequent to the SPS cancellation DCI may remain activated. Based at least in part on receiving the SPS cancellation DCI, the UE may refrain from monitoring the one or more (e.g., N) SPS occasions 405 subsequent to receiving the SPS cancellation DCI. As shown in example 400, the SPS cancellation DCI cancels one subsequent SPS occasion 405 for the UE. After the SPS occasion 405 (or N SPS occasions) subsequent to receiving the SPS cancellation DCI, the UE may automatically resume monitoring the scheduled SPS occasions 405.

The network node may transmit SPS release DCI to the UE to deactivate the SPS configuration for the UE. The UE may stop monitoring the scheduled SPS occasions 405 based at least in part on receiving the SPS release DCI. For example, the UE may refrain from monitoring any scheduled SPS occasions 405 until another SPS activation DCI is received from the base station. Whereas the SPS cancellation DCI may deactivate only a subsequent one SPS occasion 405 or a subsequent N SPS occasions 405, the SPS release DCI deactivates all subsequent SPS occasions 405 for a given SPS configuration for the UE until the given SPS configuration is activated again by a new SPS activation DCI.

As shown in example 410, a UE may be configured with a CG configuration for grant-free uplink communications. For example, the UE may receive the CG configuration via an RRC message transmitted by a network node. The CG configuration may indicate a resource allocation associated with CG uplink communications (e.g., in a time domain, frequency domain, spatial domain, and/or code domain) and a periodicity at which the resource allocation is repeated, resulting in periodically recurring scheduled CG occasions 415 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The network node may transmit CG activation DCI to the UE to activate the CG configuration for the UE. The network node may indicate, in the CG activation DCI, communication parameters, such as an MCS, an RB allocation, and/or antenna ports, for the CG physical uplink shared channel (PUSCH) communications to be transmitted in the scheduled CG occasions 415. The UE may begin transmitting in the CG occasions 415 based at least in part on receiving the CG activation DCI. For example, beginning with a next scheduled CG occasion 415 subsequent to receiving the CG activation DCI, the UE may transmit a PUSCH communication in the scheduled CG occasions 415 using the communication parameters indicated in the CG activation DCI. The UE may refrain from transmitting in configured CG occasions 415 prior to receiving the CG activation DCI.

The network node may transmit CG reactivation DCI to the UE to change the communication parameters for the CG PUSCH communications. Based at least in part on receiving the CG reactivation DCI, and the UE may begin transmitting in the scheduled CG occasions 415 using the communication parameters indicated in the CG reactivation DCI. For example, beginning with a next scheduled CG occasion 415 subsequent to receiving the CG reactivation DCI, the UE may transmit PUSCH communications in the scheduled CG occasions 415 based at least in part on the communication parameters indicated in the CG reactivation DCI.

In some cases, such as when the base station needs to override a scheduled CG communication for a higher priority communication, the network node may transmit CG cancellation DCI to the UE to temporarily cancel or deactivate one or more subsequent CG occasions 415 for the UE. The CG cancellation DCI may deactivate only a subsequent one CG occasion 415 or a subsequent N CG occasions 415 (where N is an integer). CG occasions 415 after the one or more (e.g., N) CG occasions 415 subsequent to the CG cancellation DCI may remain activated. Based at least in part on receiving the CG cancellation DCI, the UE may refrain from transmitting in the one or more (e.g., N) CG occasions 415 subsequent to receiving the CG cancellation DCI. As shown in example 410, the CG cancellation DCI cancels one subsequent CG occasion 415 for the UE. After the CG occasion 415 (or N CG occasions) subsequent to receiving the CG cancellation DCI, the UE may automatically resume transmission in the scheduled CG occasions 415.

The network node may transmit CG release DCI to the UE to deactivate the CG configuration for the UE. The UE may stop transmitting in the scheduled CG occasions 415 based at least in part on receiving the CG release DCI. For example, the UE may refrain from transmitting in any scheduled CG occasions 415 until another CG activation DCI is received from the base station. Whereas the CG cancellation DCI may deactivate only a subsequent one CG occasion 415 or a subsequent N CG occasions 415, the CG release DCI deactivates all subsequent CG occasions 415 for a given CG configuration for the UE until the given CG configuration is activated again by a new CG activation DCI.

As indicated above, FIG. 4 is provided as an example. Other examples may differ from what is described with respect to FIG. 4.

Figure 5:
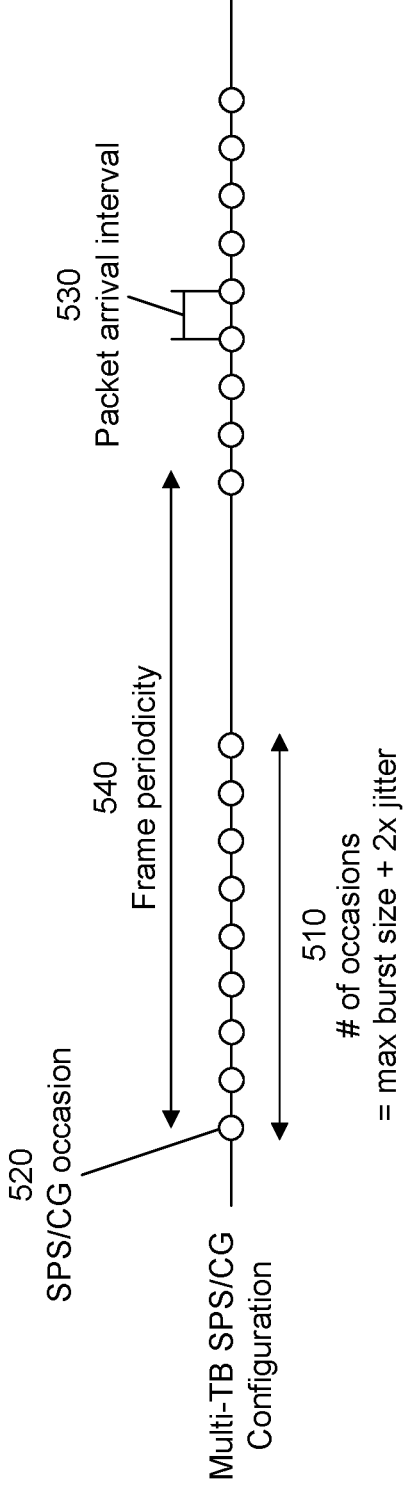
FIG. 5 is a diagram illustrating an example of an SPS and/or CG configuration communication to support bursty traffic, in accordance with the present disclosure.

FIG. 5 is a diagram illustrating an example 500 of an SPS and/or CG configuration communication to support bursty traffic, in accordance with the present disclosure. For example, as described herein, the SPS and/or CG configuration shown in FIG. 5 may be used to support extended reality (XR) traffic, which is an umbrella term that covers immersive technologies such as virtual reality (VR), augmented reality (AR), mixed reality (MR), and levels of virtuality interpolated among VR, AR, and MR.

For example, VR is a rendered version of an audiovisual scene, where the rendering is designed to mimic the visual and audio sensory stimuli of the real world as naturally as possible to an observer or a user as they move within the limits defined by the VR application. VR typically requires a user to wear a head mounted display (HMD) to completely replace a field of view with a simulated visual component, and to use headphones and/or a speaker to listen to the accompanying audio. Head and motion tracking of the user is usually also needed in VR applications to allow the simulated visual and audio components to be updated in order to ensure that, from the perspective of the user, items and sound sources remain consistent with movements of the user. In AR applications, a user is generally provided with additional information or artificially generated items or content that are overlaid upon a current environment. The additional information or content is usually visual and/or audible and observation of the current environment may be direct, with no intermediate sensing, processing and rendering, or indirect, where perception of the environment may be relayed via sensors and enhanced or processed. MR is an advanced form of AR where some virtual elements are inserted into a physical scene to provide an illusion that the elements are part of the real scene.

XR is expected to improve productivity and convenience for consumers, enterprises, and public institutions in various application areas such as entertainment, training, education, remote support, remote control, communications, and/or virtual meetings, among other examples. XR can be used in many industry segments, including health care, real estate, shopping, transportation, manufacturing, and/or other industry segments. VR is already used for gaming both at home and at dedicated venues, for virtual tours in the context of real estate, for education and training purposes, and for remote participation at live events such as concerts and sports. Furthermore, AR and MR use cases have significant potential. For example, whereas VR applications rely on HMDs that separate users from physical surroundings and restrict mobility, AR and MR applications allow users to be present in reality and move freely even when using HMDs. Many smartphone users have already experienced basic forms of AR, through games that involve searching for virtual objects in real-world environments and apps that enable shoppers to visualize new furniture in their homes before making a purchase. Furthermore, AR technology may be used with an HMD to free up a user's hands, and thereby increase worker efficiency by providing an ability to overlay information on the real world while simultaneously having hands available.

However, configuring a wireless network to support the latency requirements, quality of experience (QoE) requirements, and high data rates associated with XR traffic presents various challenges. For example, at an XR-enabled UE, XR traffic may include pose data (e.g., related to a position and an orientation within a space), video data, audio data, and/or other data transmitted by and/or to the XR-enabled UE, may have a varying video frame size over time, and/or may have quasi-periodic packet arrival times with application jitter (e.g., causing XR traffic arrival times to vary). Furthermore, traffic arrival time at a network node (e.g., a RAN node) is periodic with non-negligible jitter due to uncertain application processing times. Video frame sizes are an order of magnitude larger than packets in voice or industrial control communications, in addition to not being fixed over time. Rather, segmentation of each frame is expected, which implies that packets arrive in bursts that must be handled together to meet stringent bounded latency requirements. For example, as described herein, a burst, a traffic burst, a burst of transmissions, or the like, may refer to a sequence of consecutive packets with shorter inter-packet arrival times and/or higher traffic volumes than packets arriving before or after the sequence of consecutive packets in a burst. Accordingly, because packets arrive in bursts, XR traffic may have different characteristics than voice or other applications that SPS and/or CG configurations were designed to handle. For example, in an existing (e.g., legacy) SPS and/or CG configuration (e.g., as described above with reference to FIG. 4), SPS and/or CG occasions may be aligned with a regular traffic pattern, such as one packet every twenty (20) milliseconds for voice traffic. In an existing SPS and/or CG configuration, each SPS and/or CG occasion is an independent transmission opportunity (e.g., a single transport block can be transmitted per SPS and/or CG occasion). In contrast, XR traffic has a much higher data rate than voice, and tends to be highly bursty in the sense that many packets arrive very closely in time, and then there is an idle period before a next cycle starts and a next traffic burst arrives (e.g., a bursty traffic pattern may include sudden increases and/or decreases in traffic volumes and/or inter-packet arrival times).

Accordingly, in some aspects, FIG. 5 illustrates an enhanced SPS and/or CG configuration that may enable multiple transport blocks to be transmitted within a cycle to support XR applications or applications associated with a bursty traffic pattern. For example, as shown in FIG. 5, the enhanced SPS and/or CG configuration may include a cycle 510 that includes a sequence of multiple SPS and/or CG occasions 520, which may be similar to how a physical downlink control channel (PDCCH) search space is configured. As further shown, a number of SPS and/or CG occasions 520 included in a cycle 510 may be based at least in part on a maximum burst size (e.g., a maximum amount of data that can be transmitted to or by a UE in a given time interval) and an estimated or measured jitter (e.g., a variation or difference in latencies or delays that different packets experience when traversing a network from a transmitter to a receiver). For example, in some aspects, the number of SPS and/or CG occasions 520 included in a cycle 510 of an enhanced SPS and/or CG configuration may be the sum of the maximum burst size and twice (2×) the estimated or measured jitter. For example, the estimated or measured jitter can have a positive value or a negative value (e.g., a subsequent packet may have a larger or a smaller delay than a previous packet), whereby the number of SPS and/or CG occasions 520 included in a cycle 510 needs to cover potential jitter in both directions. Furthermore, as shown in FIG. 5, a packet arrival interval 530 may be defined as a time between adjacent SPS and/or CG occasions 520, and a frame periodicity 540 is defined as a periodicity between two adjacent cycles 510. In this way, the enhanced SPS and/or CG configuration may be suitable for XR applications or other applications with bursty traffic patterns by providing a cluster of transmission opportunities (e.g., SPS and/or CG occasions 520) such that multiple transport blocks can be transmitted in each cycle 510, by providing a time gap between adjacent occasions (e.g., the packet arrival interval 530) that is much shorter than the periodicity of legacy SPS and/or CG configurations (e.g., bursts in XR traffic may arrive every sixteen (16) milliseconds, and there may be several packets in each burst that all arrive very closely in time, such as one (1) millisecond apart), and by providing extra CG occasions 520 in each cycle 510 to accommodate jitter that may otherwise disrupt streaming video and/or audio data.

In a wireless network, HARQ processes may be used to enable HARQ feedback for requesting retransmissions of a transport block and/or performing HARQ combining (sometimes referred to as soft combining or HARQ with soft combining) over multiple transmissions of a transport block. For example, in a typical HARQ protocol, a HARQ process identifier may be associated with a data communication (e.g., a transport block). In cases where HARQ-ACK feedback is supported, a receiver may transmit an acknowledgement (ACK) to a transmitter when the transport block is successfully decoded. Otherwise, when the receiver experiences an error with reception and/or decoding of the data communication, the receiver may transmit a negative acknowledgement (NACK) to request a retransmission of the transport block. In some cases, a NACK-only HARQ-ACK feedback mode may be used, where the receiver does not transmit an ACK and only transmits a NACK when the receiver experiences an error with reception and/or decoding of the data communication. Additionally, or alternatively, in cases where HARQ combining is supported, the receiver may store received data (which may include erroneously received data) in a soft buffer, and may associate the HARQ process with the soft buffer. The same HARQ process may be used for one or more retransmissions of the data communication such that the receiver can associate data included in the retransmission(s) with the data stored in the soft buffer (e.g., the data from the original communication and/or any prior retransmissions). In this way, the receiver may combine the retransmitted data with the buffered data (e.g., using soft combining or another technique to combine data from multiple transmissions, which may include different redundancy versions of the data communication), thereby improving decoding performance.

Although HARQ feedback and/or HARQ combining has the potential to significantly boost reliability and/or decoding performance for a transport block transmitted over an air interface, techniques to map a HARQ process identifier to transmission occasions in an enhanced SPS and/or CG configuration pose challenges. For example, as described above, each transmission occasion in a legacy SPS and/or CG configuration is typically an independent transmission opportunity for a single transport block, whereby a HARQ process identifier associated with each SPS and/or CG occasion in a legacy SPS and/or CG configuration is determined according to a hard-coded mapping that is specified in one or more wireless communication standards (e.g., based on a slot index of the SPS and/or CG occasion). For example, in cases where a legacy SPS or CG configuration is configured with N HARQ process identifiers, HARQ process 1 is assigned to the first SPS or CG occasion, HARQ process N is assigned to the Nth SPS or CG occasion, and the N HARQ process identifiers then repeat sequentially in a time domain. However, in an enhanced SPS and/or CG configuration used to support XR applications or other applications associated with bursty traffic patterns, multiple transport blocks may be transmitted in a pre-scheduled burst of transmission occasions. The sequential mapping of HARQ process identifiers to SPS or CG transmission occasions may be problematic in XR (or similar) applications, however, because each period or cycle can be very short. For example, when an XR application runs at a frame rate of 120 milliseconds, the period of each burst is 8.3 milliseconds, which may approach the typical HARQ process length of three (3) times a round trip time across the air interface (e.g., where each round trip time is about one or two milliseconds). In particular, when channel conditions are poor and a HARQ process takes more than three round trip times (or three retransmissions), the HARQ process may cut into the next cycle, which creates a potential of the HARQ process blocking a new transmission using the same HARQ process in the next cycle. Accordingly, as described in further detail below with reference to FIG. 6, some aspects described herein relate to techniques to associate a HARQ process identifier with each transmission occasion in an enhanced SPS or CG configuration used to support transmitting multiple transport blocks in a pre-scheduled burst of SPS or CG occasions.

As indicated above, FIG. 5 is provided as an example. Other examples may differ from what is described with regard to FIG. 5.

Figure 6:
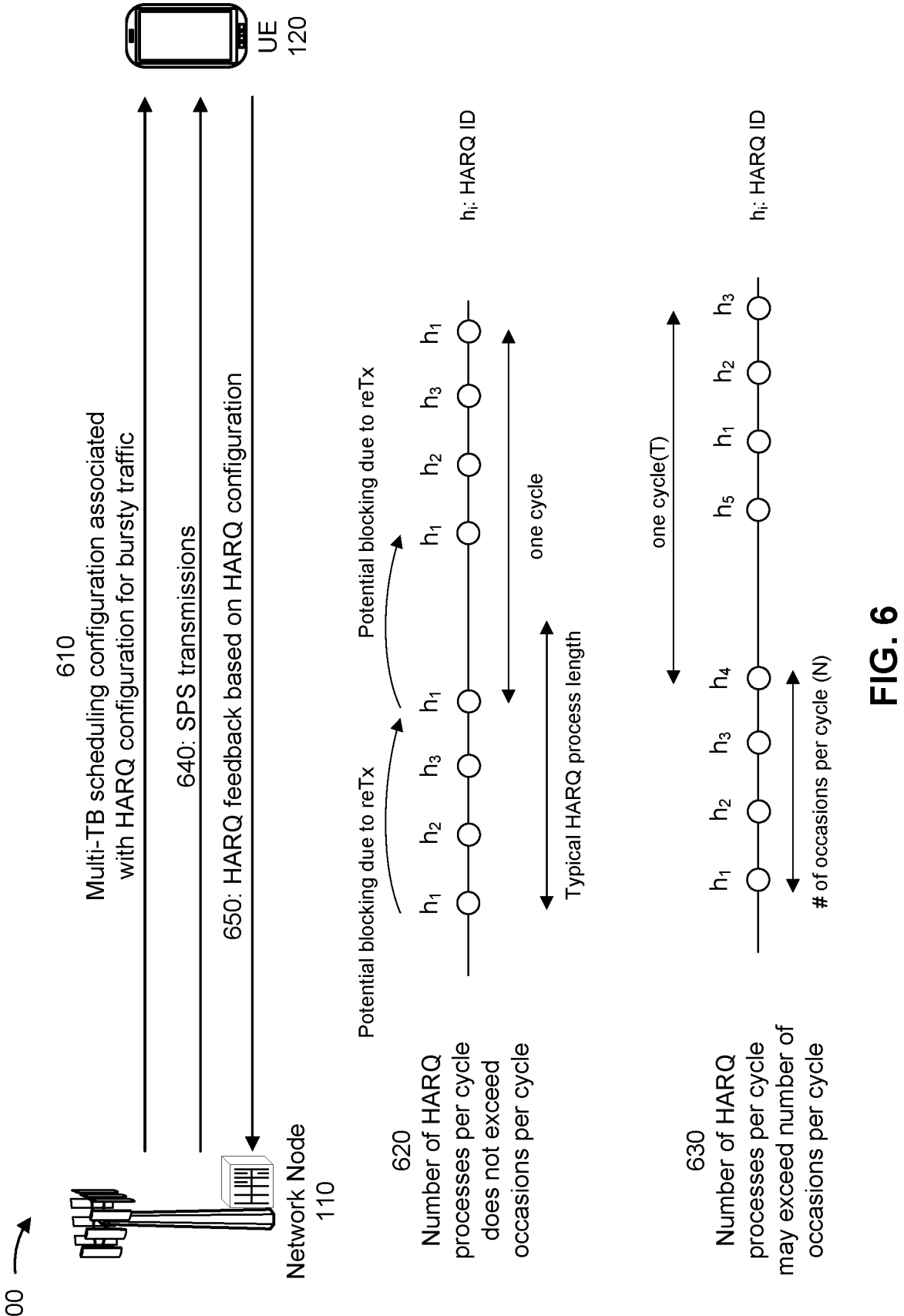
FIG. 6 is a diagram illustrating an example associated with a hybrid automatic repeat request (HARQ) process determination for an enhanced SPS and/or CG configuration, in accordance with the present disclosure.

FIG. 6 is a diagram illustrating an example 600 associated with a HARQ process determination for an enhanced SPS and/or CG configuration, in accordance with the present disclosure. As shown in FIG. 6, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown by reference number 610, the network node 110 may transmit, and the UE 120 may receive, a scheduling configuration that configures multiple transport blocks to be transmitted in a pre-scheduled burst of transmission occasions. For example, as described in further detail above with reference to FIG. 5, the scheduling configuration may include an enhanced SPS configuration that configures multiple transport blocks to be transmitted from the network node 110 to the UE 120 in a pre-scheduled burst of transmission occasions. Additionally, or alternatively, the scheduling configuration may include an enhanced CG configuration that configures multiple transport blocks to be transmitted from the UE 120 to the network node 110 in a pre-scheduled burst of transmission occasions. For example, as described herein, the scheduling configuration may include a cycle that includes a sequence of pre-scheduled bursts of transmission occasions, where a number of transmission occasions included in a cycle may be based at least in part on a maximum burst size (e.g., a maximum amount of data that can be transmitted to or by a UE in a given time interval) and an estimated or measured jitter (e.g., a variation or difference in latencies or delays that different packets experience when traversing a network from a transmitter to a receiver). For example, in some aspects, the number of transmission occasions included in a cycle of the scheduling configuration may be the sum of a maximum burst size and twice (2×) the estimated or measured jitter (e.g., to cover potential jitter in positive and negative directions). Furthermore, a packet arrival interval may be defined as a time between adjacent transmission occasions, and a frame periodicity may be defined as a periodicity between two adjacent cycles. In this way, the scheduling configuration that configures multiple transport blocks to be transmitted in a pre-scheduled burst of transmission occasions may be suitable for XR applications or other applications with bursty traffic patterns by providing a cluster of transmission opportunities (e.g., SPS occasions and/or CG occasions) in which to transmit multiple transport blocks in each cycle, by providing a time gap between adjacent occasions that is shorter than the periodicity of legacy SPS and/or CG configurations, and by providing extra transmission occasions in each cycle to accommodate potential jitter that may otherwise disrupt streaming video and/or audio data.

As further shown in FIG. 6, the scheduling configuration provided by the network node 110 may be associated with a HARQ configuration that defines a mapping between HARQ process identifiers and respective transmission occasions in a pre-scheduled burst of transmission occasions. For example, the HARQ process identifiers that are associated with the respective transmission occasions may enable HARQ-based retransmission and/or HARQ combining over multiple repetitions and/or retransmissions of a transport block, as described in further detail elsewhere herein. Accordingly, in some aspects, the network node 110 and the UE 120 may process each transmission occasion in a pre-scheduled burst of transmission occasions by associating a HARQ process identifier with each respective transmission occasion based on the HARQ configuration associated with the enhanced scheduling configuration.

For example, as shown by reference number 620, the HARQ configuration may limit a number of HARQ process identifiers used per cycle to not exceed the number of transmission occasions per cycle (e.g., the number of HARQ process identifiers used per cycle is less than or equal to the number of transmission occasions per cycle). In such cases, a pattern used to map HARQ process identifiers to the transmission occasions in a pre-scheduled burst of transmission occasions may be identical in each cycle. For example, within each cycle of the scheduling configuration, a HARQ process identifier may be associated with each transmission occasion based on a slot index or another suitable allocation pattern, and the same pattern may be used in each cycle of the scheduling configuration. For example, reference number 620 depicts an example where there are four (4) transmission occasions per cycle, and three (3) HARQ process identifiers (h1, h2, h3) per cycle. In this case, in a time domain, a first HARQ process may be assigned to the first transmission occasion in a cycle, a second HARQ process may be assigned to the next transmission occasion in the cycle, and so on, and the HARQ process identifiers then repeat sequentially in a time domain. In some cases, however, restricting the number of HARQ process identifiers to be less than or equal to the number of transmission occasions per cycle may potentially cause one or more transmission occasions to be blocked (e.g., when one or more transmission occasions are used for retransmission such that the HARQ process identifiers wrap around in a cycle when the number of transmission occasions is less than or equal to the number of HARQ processes per cycle).

Accordingly, as shown by reference number 630, the HARQ configuration associated with the scheduling configuration may permit or otherwise allow (but not necessarily require) the number of HARQ processes per cycle to be greater than or equal to the number of occasions per cycle, which may avoid the potential problem of one or more transmission occasions potentially being blocked due to a retransmission associated with one or more HARQ process identifiers. For example, in cases where the number of HARQ processes per cycle may exceed the number of occasions in a cycle of the scheduling configuration, a pattern used to map HARQ process identifiers to transmission occasions may be independent from SPS and/or CG cycles. For example, rather than associating HARQ process identifiers with transmission occasions based on a slot index of each respective transmission occasion, the HARQ configuration may define a formula to associate HARQ process identifiers with indexes of the respective transmission occasions in a sequence, cycle, or burst of pre-scheduled transmission occasions with a wrap-around enabled over different bursts. For example, in some aspects, an occasion index, $O_i$, associated with transmission occasion i may be based at least in part on a slot index associated with the transmission occasion, $s_i$, a length of a cycle, T, and a number of occasions per cycle, N. For example, the occasion index, $O_i$, associated with transmission occasion i may be defined as follows:

$$O_i = \text{floor}\left\{\frac{s_i}{T}\right\} \times N + s_i \text{ modulo } T$$

In some aspects, the HARQ process identifier that is associated with a particular transmission occasion may then be determined based on the occasion index assigned to the transmission occasion, the number of HARQ processes that are configured for the SPS or CG scheduling configuration, H, and an offset, as follows:

HARQ ID=(offset+$O_i$)modulo $H$ where the offset is an integer in a range from zero (0) to the total number of HARQ processes assigned to the SPS or CG scheduling configuration. In this way, the HARQ process identifier associated with each transmission occasion in a pre-scheduled burst of transmission occasions may avoid the potential blocking transmission by associating HARQ process identifiers with respective transmission occasions independently of the underlying bursty pattern of the SPS and/or CG cycles that can be used to transmit multiple transport blocks. For example, the modulo operations in the equations provided above may result in a wrap-around whereby HARQ processes are sequentially associated with different transmission occasions and the HARQ process identifiers wrap-around after the number of transmission occasions exceeds the total number of HARQ process identifiers configured for the SPS or CG configuration.

Accordingly, the UE 120 and the network node 110 may communicate transport blocks in the pre-scheduled burst of transmission occasions associated with the enhanced scheduling configuration based on the HARQ configuration. For example, in FIG. 6, reference numbers 640 and 650 depict communication between the UE 120 and the network node 110 in a case where the enhanced scheduling configuration is an enhanced SPS configuration. In such an example, as shown by reference number 640, the network node 110 may transmit multiple transport blocks to the UE 120 in multiple SPS occasions that are included in a cycle, where each transport block is associated with a HARQ process identifier. In some aspects, the UE 120 may then determine the HARQ process identifier associated with each SPS occasion based on the applicable HARQ configuration (e.g., depending on whether the number of HARQ processes is restricted to not exceed the number of SPS occasions in a cycle or permitted to exceed the number of SPS occasions in a cycle). As shown by reference number 650, the UE 120 may attempt to decode each transport block that is transmitted in an SPS occasion, and may transmit HARQ feedback (e.g., an ACK or NACK) associated with the HARQ process identifier to the network node 110 (e.g., to trigger a retransmission or otherwise indicate a decoding result). Additionally, or alternatively, substantially the same techniques may be used in reverse in cases where the enhanced scheduling configuration is an enhanced configured grant configuration. For example, in an enhanced configured grant configuration, the UE 120 may transmit, to the network node 110, multiple transport blocks in multiple configured grant occasions that are each associated with a HARQ process identifier, and the network node 110 may determine the HARQ process identifier associated with each CG occasion based on the applicable HARQ configuration, attempt to decode each transport block that is transmitted in a configured grant occasion, and/or transmit HARQ feedback associated with the HARQ process identifier to the UE 120 to indicate a corresponding decoding result.

As indicated above, FIG. 6 is provided as an example. Other examples may differ from what is described with regard to FIG. 6.

FIG. 7 is a diagram illustrating an example process 700 performed, for example, by a UE, in accordance with the present disclosure. Example process 700 is an example where the UE (e.g., UE 120) performs operations associated with HARQ process determination for an enhanced SPS and/or CG configuration.

As shown in FIG. 7, in some aspects, process 700 may include receiving, from a network entity, a scheduling configuration that configures multiple transport blocks to be transmitted in a pre-scheduled burst of transmission occasions (block 710). For example, the UE (e.g., using communication manager 140 and/or reception component 902, depicted in FIG. 9) may receive, from a network entity, a scheduling configuration that configures multiple transport blocks to be transmitted in a pre-scheduled burst of transmission occasions, as described above.

As further shown in FIG. 7, in some aspects, process 700 may include communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration (block 720). For example, the UE (e.g., using communication manager 140 and/or HARQ process determination component 908, depicted in FIG. 9) may process, for each transmission occasion in the pre-scheduled burst of transmission occasions, a transport block transmitted in a respective transmission occasion according to a HARQ process identifier that is based at least in part on a HARQ configuration associated with the scheduling configuration, as described above.

Process 700 may include additional aspects, such as any single aspect or any combination of aspects described below and/or in connection with one or more other processes described elsewhere herein.

In a first aspect, the scheduling configuration is an SPS configuration that configures multiple transport blocks to be transmitted from the network entity to the UE in the pre-scheduled burst of transmission occasions.

In a second aspect, alone or in combination with the first aspect, the scheduling configuration is a CG configuration that configures multiple transport blocks to be transmitted from the UE to the network entity in the pre-scheduled burst of transmission occasions.

In a third aspect, alone or in combination with one or more of the first and second aspects, the HARQ configuration restricts a number of HARQ process identifiers in the pre-scheduled burst of transmission occasions to be less than or equal to a number of transmission occasions in the pre-scheduled burst of transmission occasions.

In a fourth aspect, alone or in combination with one or more of the first through third aspects, a pattern to associate the HARQ process identifier with each respective transmission occasion in the pre-scheduled burst of transmission occasions is identical in each cycle of the scheduling configuration.

In a fifth aspect, alone or in combination with one or more of the first through fourth aspects, the HARQ configuration permits a number of HARQ process identifiers in the pre-scheduled burst of transmission occasions to equal or exceed a number of transmission occasions in the pre-scheduled burst of transmission occasions.

In a sixth aspect, alone or in combination with one or more of the first through fifth aspects, a pattern to associate the HARQ process identifier with each respective transmission occasion in the pre-scheduled burst of transmission occasions is based at least in part on an index associated with each respective transmission occasion, an offset associated with the scheduling configuration, and the number of HARQ process identifiers in the pre-scheduled burst of transmission occasions.

In a seventh aspect, alone or in combination with one or more of the first through sixth aspects, the index associated with each respective transmission occasion is based at least in part on a slot index associated with the respective transmission occasion, a cycle length associated with the scheduling configuration, and the number of transmission occasions in the pre-scheduled burst of transmission occasions.

In an eighth aspect, alone or in combination with one or more of the first through seventh aspects, the offset associated with the scheduling configuration is an integer in a range from zero to a total number of HARQ process identifiers assigned to the scheduling configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network entity, in accordance with the present disclosure. Example process 800 is an example where the network entity (e.g., network node 110, CU 310, DU 330, RU 340, or the like) performs operations associated with HARQ process determination for an enhanced SPS and/or CG configuration.

As shown in FIG. 8, in some aspects, process 800 may include transmitting, to a UE, a scheduling configuration that configures multiple transport blocks to be transmitted in a pre-scheduled burst of transmission occasions (block 810). For example, the network entity (e.g., using communication manager 150 and/or transmission component 1004, depicted in FIG. 10) may transmit, to a UE, a scheduling configuration that configures multiple transport blocks to be transmitted in a pre-scheduled burst of transmission occasions, as described above.

As further shown in FIG. 8, in some aspects, process 800 may include communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration (block 820). For example, the network entity (e.g., using communication manager 150 and/or HARQ process determination component 1008, depicted in FIG. 10) may process, for each transmission occasion in the pre-scheduled burst of transmission occasions, a transport block transmitted in a respective transmission occasion according to a HARQ process identifier that is based at least in part on a HARQ configuration associated with the scheduling configuration, as described above.

Process 800 may include additional aspects, such as any single aspect or any combination of aspects described below and/or in connection with one or more other processes described elsewhere herein.

In a first aspect, the scheduling configuration is an SPS configuration that configures multiple transport blocks to be transmitted from the network entity to the UE in the pre-scheduled burst of transmission occasions.

In a second aspect, alone or in combination with the first aspect, the scheduling configuration is a CG configuration that configures multiple transport blocks to be transmitted from the UE to the network entity in the pre-scheduled burst of transmission occasions.

In a third aspect, alone or in combination with one or more of the first and second aspects, the HARQ configuration restricts a number of HARQ process identifiers in the pre-scheduled burst of transmission occasions to be less than or equal to a number of transmission occasions in the pre-scheduled burst of transmission occasions.

In a fourth aspect, alone or in combination with one or more of the first through third aspects, a pattern to associate the HARQ process identifier with each respective transmission occasion in the pre-scheduled burst of transmission occasions is identical in each cycle of the scheduling configuration.

In a fifth aspect, alone or in combination with one or more of the first through fourth aspects, the HARQ configuration permits a number of HARQ process identifiers in the pre-scheduled burst of transmission occasions to equal or exceed a number of transmission occasions in the pre-scheduled burst of transmission occasions.

In a sixth aspect, alone or in combination with one or more of the first through fifth aspects, a pattern to associate the HARQ process identifier with each respective transmission occasion in the pre-scheduled burst of transmission occasions is based at least in part on an index associated with each respective transmission occasion, an offset associated with the scheduling configuration, and the number of HARQ process identifiers in the pre-scheduled burst of transmission occasions.

In a seventh aspect, alone or in combination with one or more of the first through sixth aspects, the index associated with each respective transmission occasion is based at least in part on a slot index associated with the respective transmission occasion, a cycle length associated with the scheduling configuration, and the number of transmission occasions in the pre-scheduled burst of transmission occasions.

In an eighth aspect, alone or in combination with one or more of the first through seventh aspects, the offset associated with the scheduling configuration is an integer in a range from zero to a total number of HARQ process identifiers assigned to the scheduling configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
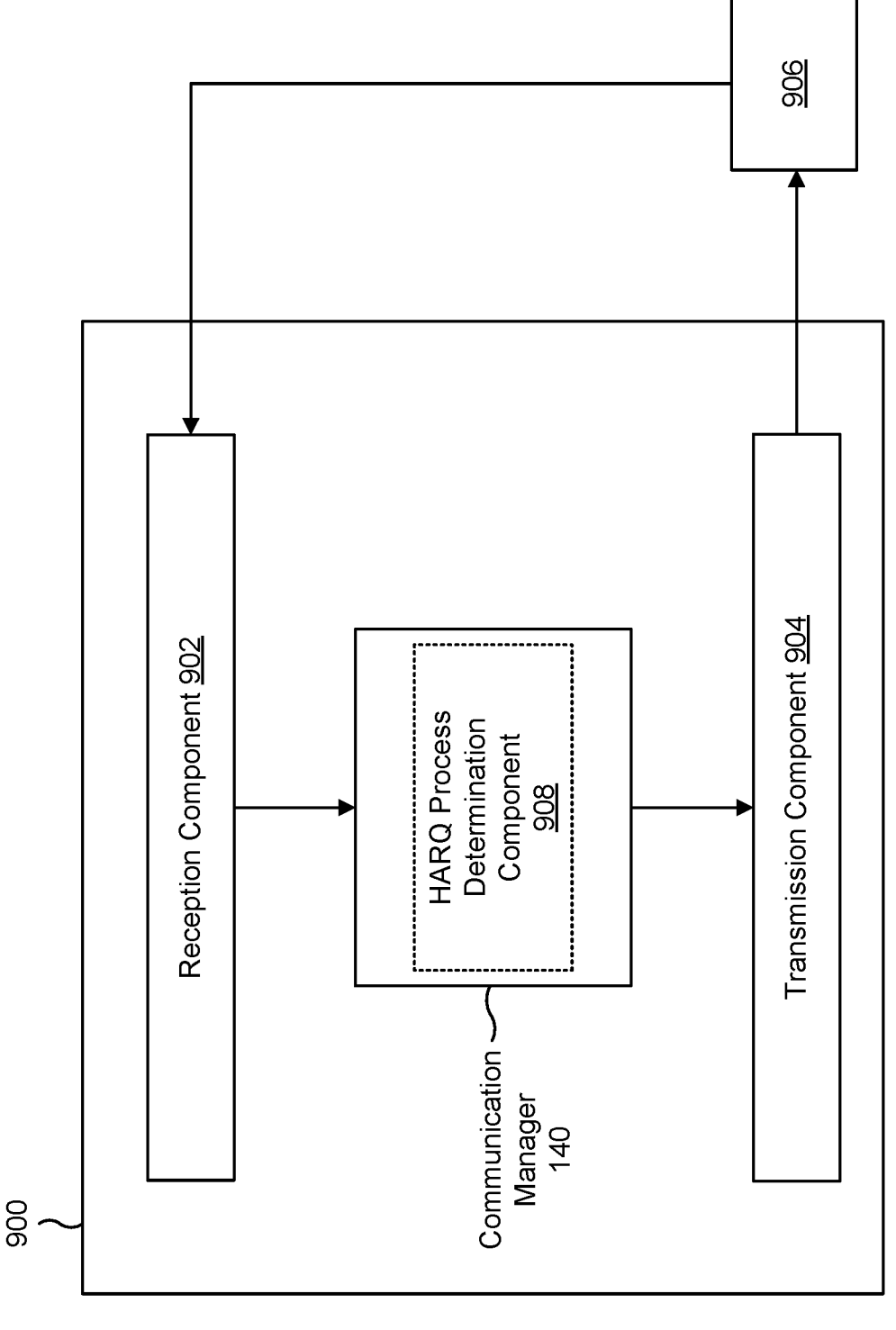
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. As further shown, the communication manager 140 may include a HARQ process determination component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a network entity, a scheduling configuration that configures multiple transport blocks to be transmitted in a pre-scheduled burst of transmission occasions. The HARQ process determination component 908 may communicate, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
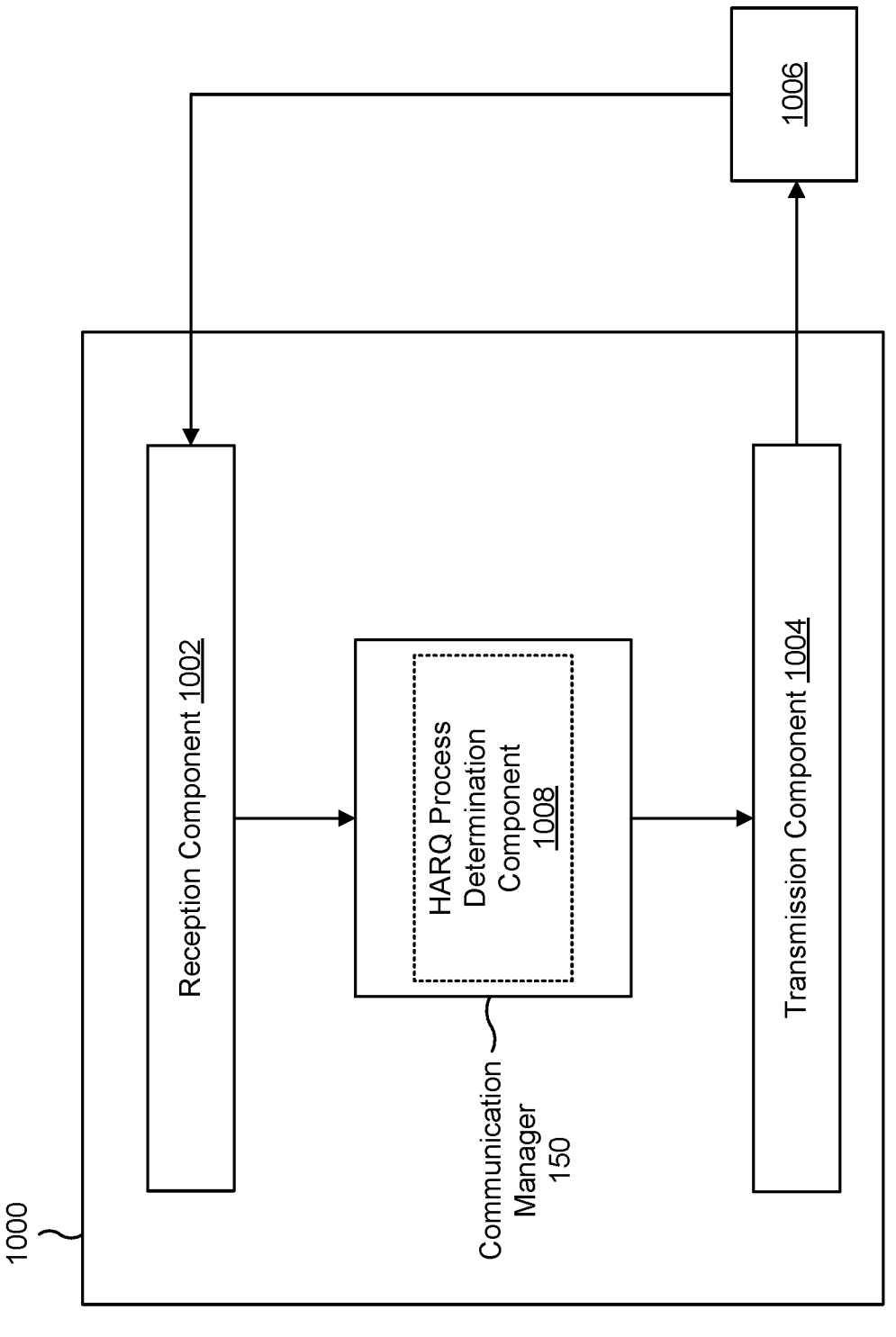

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. As further shown, the communication manager 150 may include a HARQ process determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/ processor, a memory, or a combination thereof, of the network entity described in connection with FIG. 2. In some aspects, the transmission component 1004 may be co-located with the reception component 1002 in a transceiver.

The transmission component 1004 may transmit, to a UE, a scheduling configuration that configures multiple transport blocks to be transmitted in a pre-scheduled burst of transmission occasions. The HARQ process determination component 1008 may communicate, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving, from a network entity, a scheduling configuration that configures multiple transport blocks to be transmitted in a pre-scheduled burst of transmission occasions; and communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Aspect 2: The method of Aspect 1, wherein the scheduling configuration is an SPS configuration that configures multiple transport blocks to be transmitted from the network entity to the UE in the pre-scheduled burst of transmission occasions.

Aspect 3: The method of any of Aspects 1-2, wherein the scheduling configuration is a CG configuration that configures multiple transport blocks to be transmitted from the UE to the network entity in the pre-scheduled burst of transmission occasions.

Aspect 4: The method of any of Aspects 1-3, wherein the HARQ configuration restricts a number of HARQ process identifiers in the pre-scheduled burst of transmission occasions to be less than or equal to a number of transmission occasions in the pre-scheduled burst of transmission occasions.

Aspect 5: The method of Aspect 4, wherein a pattern to associate the HARQ process identifier with each respective transmission occasion in the pre-scheduled burst of transmission occasions is identical in each cycle of the scheduling configuration.

Aspect 6: The method of any of Aspects 1-3, wherein the HARQ configuration permits a number of HARQ process identifiers in the pre-scheduled burst of transmission occasions to equal or exceed a number of transmission occasions in the pre-scheduled burst of transmission occasions.

Aspect 7: The method of Aspect 6, wherein a pattern to associate the HARQ process identifier with each respective transmission occasion in the pre-scheduled burst of transmission occasions is based at least in part on an index associated with each respective transmission occasion, an offset associated with the scheduling configuration, and the number of HARQ process identifiers in the pre-scheduled burst of transmission occasions.

Aspect 8: The method of Aspect 7, wherein the index associated with each respective transmission occasion is based at least in part on a slot index associated with the respective transmission occasion, a cycle length associated with the scheduling configuration, and the number of transmission occasions in the pre-scheduled burst of transmission occasions.

Aspect 9: The method of any of Aspects 7-8, wherein the offset associated with the scheduling configuration is an integer in a range from zero to a total number of HARQ process identifiers assigned to the scheduling configuration.

Aspect 10: A method of wireless communication performed by a network entity, comprising: transmitting, to a UE, a scheduling configuration that configures multiple transport blocks to be transmitted in a pre-scheduled burst of transmission occasions; and communicating, for each transmission occasion in the pre-scheduled burst of transmission occasions, a transport block that is transmitted in a respective transmission occasion and associated with a HARQ process identifier that is based at least in part on a HARQ configuration associated with the scheduling configuration.

Aspect 11: The method of Aspect 10, wherein the scheduling configuration is an SPS configuration that configures multiple transport blocks to be transmitted from the network entity to the UE in the pre-scheduled burst of transmission occasions.

Aspect 12: The method of any of Aspects 10-11, wherein the scheduling configuration is a CG configuration that configures multiple transport blocks to be transmitted from the UE to the network entity in the pre-scheduled burst of transmission occasions.

Aspect 13: The method of any of Aspects 10-12, wherein the HARQ configuration restricts a number of HARQ process identifiers in the pre-scheduled burst of transmission occasions to be less than or equal to a number of transmission occasions in the pre-scheduled burst of transmission occasions.

Aspect 14: The method of Aspect 13, wherein a pattern to associate the HARQ process identifier with each respective transmission occasion in the pre-scheduled burst of transmission occasions is identical in each cycle of the scheduling configuration.

Aspect 15: The method of any of Aspects 10-12, wherein the HARQ configuration permits a number of HARQ process identifiers in the pre-scheduled burst of transmission occasions to equal or exceed a number of transmission occasions in the pre-scheduled burst of transmission occasions.

Aspect 16: The method of Aspect 15, wherein a pattern to associate the HARQ process identifier with each respective transmission occasion in the pre-scheduled burst of transmission occasions is based at least in part on an index associated with each respective transmission occasion, an offset associated with the scheduling configuration, and the number of HARQ process identifiers in the pre-scheduled burst of transmission occasions.

Aspect 17: The method of Aspect 16, wherein the index associated with each respective transmission occasion is based at least in part on a slot index associated with the respective transmission occasion, a cycle length associated with the scheduling configuration, and the number of transmission occasions in the pre-scheduled burst of transmission occasions.

Aspect 18: The method of any of Aspects 16-17, wherein the offset associated with the scheduling configuration is an integer in a range from zero to a total number of HARQ process identifiers assigned to the scheduling configuration.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to cause the UE to:

receive, from a network entity, a scheduling configuration that configures multiple transport blocks to be transmitted in a pre-scheduled burst of transmission occasions; and communicate, for each transmission occasion in the pre-scheduled burst of transmission occasions, a transport block that is transmitted in a respective transmission occasion and associated with a hybrid automatic repeat request (HARQ) process identifier that is based at least in part on a HARQ configuration associated with the scheduling configuration, wherein the HARQ configuration permits a number of HARQ process identifiers in the pre-scheduled burst of transmission occasions to equal or exceed a number of transmission occasions in the pre-scheduled burst of transmission occasions, wherein a pattern to associate the HARQ process identifier with each respective transmission occasion in the pre-scheduled burst of transmission occasions is based at least in part on an index associated with each respective transmission occasion, an offset associated with the scheduling configuration, and the number of HARQ process identifiers in the pre-scheduled burst of transmission occasions, and wherein the offset associated with the scheduling configuration is an integer in a range from zero to a total number of HARQ process identifiers assigned to the scheduling configuration.

2. The UE of claim 1, wherein the scheduling configuration is a semi-persistent scheduling configuration that configures multiple transport blocks to be transmitted from the network entity to the UE in the pre-scheduled burst of transmission occasions.

3. The UE of claim 1, wherein the scheduling configuration is a configured grant configuration that configures multiple transport blocks to be transmitted from the UE to the network entity in the pre-scheduled burst of transmission occasions.

4. The UE of claim 1, wherein the index associated with each respective transmission occasion is based at least in part on a slot index associated with the respective transmission occasion, a cycle length associated with the scheduling configuration, and the number of transmission occasions in the pre-scheduled burst of transmission occasions.

5. A network entity for wireless communication, comprising:

one or more memories; and one or more processors, coupled to the one or more memories, configured to cause the network entity to:

transmit, to a user equipment (UE), a scheduling configuration that configures multiple transport blocks to be transmitted in a pre-scheduled burst of transmission occasions; and communicate, for each transmission occasion in the pre-scheduled burst of transmission occasions, a transport block that is transmitted in a respective transmission occasion and associated with a hybrid automatic repeat request (HARQ) process identifier that is based at least in part on a HARQ configuration associated with the scheduling configuration, wherein the HARQ configuration permits a number of HARQ process identifiers in the pre-scheduled burst of transmission occasions to equal or exceed a number of transmission occasions in the pre-scheduled burst of transmission occasions, wherein a pattern to associate the HARQ process identifier with each respective transmission occasion in the pre-scheduled burst of transmission occasions is based at least in part on an index associated with each respective transmission occasion, an offset associated with the scheduling configuration, and the number of HARQ process identifiers in the pre-scheduled burst of transmission occasions, and wherein the offset associated with the scheduling configuration is an integer in a range from zero to a total number of HARQ process identifiers assigned to the scheduling configuration.

6. The network entity of claim 5, wherein the scheduling configuration is a semi-persistent scheduling configuration that configures multiple transport blocks to be transmitted from the network entity to the UE in the pre-scheduled burst of transmission occasions.

7. The network entity of claim 5, wherein the scheduling configuration is a configured grant configuration that configures multiple transport blocks to be transmitted from the UE to the network entity in the pre-scheduled burst of transmission occasions.

8. The network entity of claim 5, wherein the index associated with each respective transmission occasion is based at least in part on a slot index associated with the respective transmission occasion, a cycle length associated with the scheduling configuration, and the number of transmission occasions in the pre-scheduled burst of transmission occasions.

9. A method of wireless communication performed by a user equipment (UE), comprising:

receiving, from a network entity, a scheduling configuration that configures multiple transport blocks to be transmitted in a pre-scheduled burst of transmission occasions; and communicating, for each transmission occasion in the pre-scheduled burst of transmission occasions, a transport block that is transmitted in a respective transmission occasion and associated with a hybrid automatic repeat request (HARQ) process identifier that is based at least in part on a HARQ configuration associated with the scheduling configuration, wherein the HARQ configuration permits a number of HARQ process identifiers in the pre-scheduled burst of transmission occasions to equal or exceed a number of transmission occasions in the pre-scheduled burst of transmission occasions, wherein a pattern to associate the HARQ process identifier with each respective transmission occasion in the pre-scheduled burst of transmission occasions is based at least in part on an index associated with each respective transmission occasion, an offset associated with the scheduling configuration, and the number of HARQ process identifiers in the pre-scheduled burst of transmission occasions, and wherein the index associated with each respective transmission occasion is based at least in part on a slot index associated with the respective transmission occasion, a cycle length associated with the scheduling configuration, and the number of transmission occasions in the pre-scheduled burst of transmission occasions.

10. The method of claim 9, wherein the scheduling configuration is a semi-persistent scheduling configuration that configures multiple transport blocks to be transmitted from the network entity to the UE in the pre-scheduled burst of transmission occasions.

11. The method of claim 9, wherein the scheduling configuration is a configured grant configuration that configures multiple transport blocks to be transmitted from the UE to the network entity in the pre-scheduled burst of transmission occasions.

12. A method of wireless communication performed by a network entity, comprising:

transmitting, to a user equipment (UE), a scheduling configuration that configures multiple transport blocks to be transmitted in a pre-scheduled burst of transmission occasions; and communicating, for each transmission occasion in the pre-scheduled burst of transmission occasions, a transport block that is transmitted in a respective transmission occasion and associated with a hybrid automatic repeat request (HARQ) process identifier that is based at least in part on a HARQ configuration associated with the scheduling configuration, wherein the HARQ configuration permits a number of HARQ process identifiers in the pre-scheduled burst of transmission occasions to equal or exceed a number of transmission occasions in the pre-scheduled burst of transmission occasions, wherein a pattern to associate the HARQ process identifier with each respective transmission occasion in the pre-scheduled burst of transmission occasions is based at least in part on an index associated with each respective transmission occasion, an offset associated with the scheduling configuration, and the number of HARQ process identifiers in the pre-scheduled burst of transmission occasions, and wherein the index associated with each respective transmission occasion is based at least in part on a slot index associated with the respective transmission occasion, a cycle length associated with the scheduling configuration, and the number of transmission occasions in the pre-scheduled burst of transmission occasions.

13. The method of claim 12, wherein the scheduling configuration is a semi-persistent scheduling configuration that configures multiple transport blocks to be transmitted from the network entity to the UE in the pre-scheduled burst of transmission occasions.

14. The method of claim 12, wherein the scheduling configuration is a configured grant configuration that configures multiple transport blocks to be transmitted from the UE to the network entity in the pre-scheduled burst of transmission occasions.

15. The method of claim 9, wherein the offset associated with the scheduling configuration is an integer in a range from zero to a total number of HARQ process identifiers assigned to the scheduling configuration.

16. The UE of claim 12, wherein the offset associated with the scheduling configuration is an integer in a range from zero to a total number of HARQ process identifiers assigned to the scheduling configuration.

* * * * *